3,479,211
METHOD OF FLAMEPROOFING CELLULOSIC
MATERIALS
Irving S. Goldstein, Downers Grove, Ill., assignor to
Continental Can Company, Inc., New York, N.Y., a
corporation of New York
No Drawing. Filed Oct. 27, 1967, Ser. No. 678,523
Int. Cl. D06m *15/64;* C09k *3/28*
U.S. Cl. 117—136                                6 Claims

ABSTRACT OF THE DISCLOSURE

A method of flameproofing cellulosic materials wherein the material is impregnated with a substantially insoluble thermoset resin having a particle size of less than 50 microns, the thermoset resin containing in polymerized form phosphorus and a nitrogen compound having the structural formula

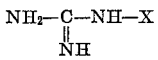

wherein X is either

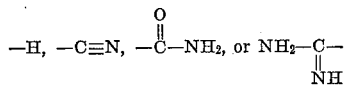

BACKGROUND OF INVENTION

Field of invention

This invention relates to the flameproofing of articles, and more particularly to the permanent, i.e., water resistant, flameproofing of cellulosic articles.

The prior art

The flameproofing of cellulosic articles is well known to the art. The method of flameproofing generally involves impregnating the cellulosic article with a water-soluble incombustible compound which imparts flame resistance to the article. As these compounds are water-soluble, they are readily removed by simple washing, thereby destroying the flameproofing effect. Methods have been developed to flameproof cellulosic articles which are permanent to washing. These methods involve impregnating the cellulosic article with a water-soluble, incombustible thermosetting resin and then heating the article to cure and insolubilize the resin. Although the aforementioned method produces a cellulosic article which is flameproof after washing, the flameproofed article is stiffened and hardened to a degree that renders it unsuitable for a variety of commercial applications in which cellulosic articles are generally employed.

SUMMARY OF THE INVENTION

In accordance with the present invention, there is provided a method for flameproofing cellulosic materials wherein the article to be flameproofed is impregnated with particles of a substantially water-insoluble thermoset resin, said resin containing in polymerized form at least about 5% by weight phosphorus and at least 25% by weight nitrogen provided by a compound having the structural formula:

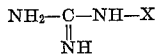

wherein X is selected from the group of radicals including cyano (—C≡N),

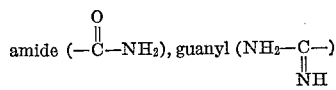

and hydrogen (—H), the particle size of the thermoset resin being less than 50 microns.

The flameproofed cellulosic articles prepared by the method of the present invention are soft and pliable and similar to untreated materials in "feel" and "handle" and show no substantial alteration in stiffness or hardness. The thermoset resin is permanently attached to the cellulosic article and the article retains its flameproof properties even after prolonged washing.

PREFERRED EMBODIMENTS

The thermoset resins employed in the process of the present invention are known to the art and can be prepared by means conventional to the art.

Thus, a nitrogen-containing compound having the structural formula

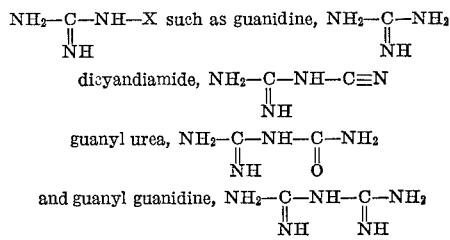

is reacted with an equimolar proportion or a slight excess of a phosphorus-containing compound, such as phosphoric acid, in the presence of water, to form a reaction product which may be cured by heating at 40° to 100° C. to a hard, infusible, water-insoluble thermoset resin in the presence of an aldehyde, such as formaldehyde or acetaldehyde, or a polyamine, such as urea, melamine, or a mixture of the aldehyde and polyamine. The cured resin is a hard, infusible material which is then ground to a particle size of 50 microns or less. As will hereinafter be illustrated, it is a critical and essential feature of the present invention that the particle size of the thermoset resin used to flameproof the cellulosic article be 50 microns or less. If the particle size exceeds 50 microns, less than acceptable flameproofing properties are imparted to the cellulosic article.

The thermoset resin may be incorporated in the cellulosic article at any stage of manufacture. Thus, the thermoset resin may be applied to the cellulosic body in the raw state, in some process state, or in the form of some manufacture.

Although the present description is concerned primarily with paper, it is to be understood that the present invention is applicable to textile fabrics, for instance, woven or pleated fabrics, threads, yarns, filaments and natural and synthetic fibers made of cotton, linen, jute, regenerated cellulose, cellulose acetate, and the like.

In flameproofing of cellulosic materials such as paper, the thermoset resin may be conveniently added to an aqueous suspension of the cellulose fibers. For optimum results, contact between the fibers in suspension and the thermoset resin should be promoted to insure uniform distribution through the cellulosic material. Thus, the thermoset resin may be added to a dilute aqueous suspension of paper pulp, as in the beater stock chest, fan pump, and so forth, with agitation and mixing. The thermoset resin which is used in the invention may be added to the aqueous suspension of pulp as an aqueous slurry over a wide range of concentration, as from less than 1% to 50% or higher if desired.

In order to obtain satisfactory flameproofing of the cellulosic article, the amount of resin added to the pulp is adjusted so that the finished cellulosic article contains at least 10% based on the dry weight of the article of the thermoset resin, and generally about 15% to about 25% by weight of the thermoset resin.

In treating paper pulp with a slurry of the thermoset resin, the preferred consistency of the fibrous suspension is that which promotes rapid and uniform distribution and contacting of the thermoset resin particles and the pulp fibers. Thus, the consistency of the paper pulp may be as low as 0.1% or as high as 10%. At this consistency range, in order for at least 10% of the resin to be incorporated in the finished paper product, the aqueous slurry of thermoset resin added to the pulp suspension should contain about 1% to about 20% by weight of the resin.

After addition of the thermoset resin to the paper pulp, the pulp may be formed into a sheet on any suitable equipment, such as on any of the various types of papermaking equipment, including laboratory types having sieves or screens for making handsheets, as well as commercial machines, such as Fourdrinier and cylinder machines.

In flameproofing paper products, the process of the invention may be carried out in the presence of, or in conjunction with, conventional sizing materials, or other conventional pulp additives, such as pigments, fillers, such as titanium dioxide, talc or clays. Likewise, if desired, there may be used an emulsifier or dispersing agent, such as non-ionic emulsifiers, as an aid in dispersing the cellulose fibers, as well as the thermoset resin.

In flameproofing cellulosic materials in sheet form, such as paper sheet or cotton or rayon cloth, the cellulosic material may be impregnated with the thermoset resin by immersing the material in or passing the sheet through an aqeuous slurry of the thermoset resin particles, squeezing through rollers, and then drying to remove the water.

Flameproof synthetic cellulosic filaments such as rayon filaments may be prepared by incorporating the thermoset resin in the spinning dope prior to the spinning of the filaments.

The following examples illustrate the process of the present invention, but are in no way intended to limit the scope thereof.

EXAMPLE I

A thermoset resin was prepared by mixing 42 grams (0.5 mole) of dicyanamide with 72 grams (0.625 mole) of 85% phosphoric acid in 100 grams of water at 90° C. for 10 minutes. To this reaction mixture was added 15.75 grams (0.125 mole) melamine and 52 grams (0.625 mole) 36% formaldehyde and the reaction mixture heated to 100° C. for 30 minutes with constant stirring. The water from the reaction mixture was distilled off and the viscous liquid residue was heated at 100° C. for 6 hours to form a hard, infusible resin.

The resin was then ground to a particle size that would pass through a 325 mesh (44 micron) screen. Varying amounts of these resin particles were added with constant stirring to weighed portions of an unbleached kraft pulp slurry diluted to about 0.5% consistency. The cloudy suspensions were poured all at once into a Buchner funnel and the pad of pulp collected by suction on filter paper. The pad and filter paper assembly were then dried and weighed for total resin retention.

The resin impregnated paper pads were held in the flame of a Bunsen burner at an angle approaching the vertical so that flame spread was encouraged. The following ratings were given to the paper pads tested for flamability by this method.

0—self-extinguishing. No flame spread.
1—self-extinguishing. Slight flame spread.
2—self-extinguishing. Moderate flame spread.
3—burned slowly but completely.
4—some slowing of flame spread.
5—rapid flame spread.

To determine whether the treated paper was premanently flameproofed, the samples underwent extensive washing with running water for 30 mintues. The washed samples were dried and then tested again for flammability to determine whether the flameproofing agent had been washed from the paper.

For purposes of contrast, paper pulp treated in the manner of Example I with resin samples having particles sizes greater than 50 microns were also tested for flammability.

For purposes of further contrast, paper pulp treated in the manner of Example I with thermoset resins outside the scope of the present invention were also tested for flammability.

The compositions of the various resins tested, their solubility, particle, size, and the flame test ratings of paper impregnated with these resins are summarized in the following table.

TABLE

| Run No.: | Resin Components (moles) | | | | Resin Sol. in $H_2O$, percent | Resin Content, percent of pulp | Particle Size, microns | Flame Test Rating | Water Wash Results |
|---|---|---|---|---|---|---|---|---|---|
| | Dicyandiamide | $H_3PO_4$ | Melamine | HCHO | | | | | |
| 1 | 0.5 | 0.625 | 0.125 | 0.625 | <0.1 | 29 | <50 | 1 | (¹) |
| 2 | 0.5 | 0.625 | 0.125 | 0.625 | <0.1 | 24 | <50 | 2 | |
| 3 | 0.5 | 0.625 | 0.125 | 0.625 | <0.1 | 24 | >50 | 3 | N.T.² |
| 4 | 0.5 | 0.625 | 0.125 | 0.625 | <0.1 | 34 | >50 | 3 | N.T.² |
| 5 | 0.5 | 0.625 ($H_2SO_4$) | 0.125 | 0.625 | <0.1 | 25 | <50 | 3 | N.Y.² |
| 6 | 0.5 | 0.5 | | 0.5 | 25.0 | 10 | >50 | 3 | N.T.² |
| 7 | | 0.5 | 0.5 | 1.0 | <0.1 | 32 | 44 | 3 | N.T.² |
| 8 | | 1.5 | 0.5 | | 0.7 | 20 | | 0 | (³) |

¹ Flammability did not change after water wash.
² Not tested as original flame test rating too high for commercial use.
³ Burned readily after water wash.

By reference to the table, it is at once apparent that paper treated with thermoset resins in accordance with the process of the present invention, i.e., Run Numbers 1 and 2, show excellent self-extinguishing properties even after extensive washing over paper treated with an equivalent resin in a manner outside the scope of the present invention, i.e., either the particle size is greater than 50 microns (Run No. 3), the resin does not contain phosphorus (Run No. 5), the resin does not contain dicyandiamide (Run No. 7), or the resin was water-soluble (Run No. 8).

EXAMPLE II

The procedure of Example I was repeated with the exception that a water-insoluble thermoset resin comprised of the reaction product of 0.5 mole dicyandiamide, 0.125 mole trimethylomelamine, 0.625 mole $H_3PO_4$, and 0.5 mole of formaldehyde was used. The thermoset resin had a particle size of 2.5 to 5.0 microns. A paper impregnated to contain 24% of the resin had a flame test rating of 0. The flame test rating did not change upon extensive washing of the paper.

EXAMPLE III

A strip of cotton toweling was dipped in an aqueous slurry containing 4% of a thermoset resin prepared as in Example II. After contact with the slurry, the toweling was dried. The resin used in the slurry had a maximum particle size of 20 microns. Three dip-and-dry treatments provided a 25% resin impregnation. The treated toweling had a flammability rating of 0 after washing with water and drying.

What is claimed is:

1. A method for flameproofing cellulose materials which comprises incorporating in the cellulose materal at least 10% based on the anhydrous weight of the material, particles of a substantially water-insoluble thermoset resin containing in polymerized form at least about 5% by weight phosphorus and at least 25% by weight nitrogen provided by a compound having the structural formula

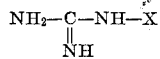

wherein X is selected from the group of radicals consisting of cyano, amide, guanyl, and hydrogen, the particle size of the resin being a maximum of 50 microns.

2. The method of claim 1 wherein the cellulose material is paper.
3. The method of claim 1 wherein the cellulose material is cotton.
4. The method of claim 1 wherein the nitrogen containing compound is dicyandiamide.
5. The method of claim 1 wherein the thermoset resin is the reaction product of dicyandiamide, phosphoric acid, formaldehyde and melamine.
6. The method of claim 1 wherein the thermoset resin is the reaction product of dicyandiamide, phosphoric acid, formaldehyde, and trimethylolmelamine.

References Cited

UNITED STATES PATENTS

| | | | |
|---|---|---|---|
| 2,482,755 | 9/1949 | Ford et al. | 117—137 X |
| 2,488,034 | 11/1949 | Pingree et al. | 161—403 X |
| 2,530,261 | 11/1950 | Morton et al. | 117—137 X |
| 2,540,352 | 2/1951 | Schenck | 117—155 |
| 2,582,961 | 1/1952 | Burnell et al. | |
| 2,628,946 | 2/1953 | Juda et al. | 117—155 X |
| 2,917,408 | 12/1959 | Goldstein et al | 117—137 X |
| 3,047,425 | 7/1962 | Hirshfeld et al. | 117—136 X |

FOREIGN PATENTS 578,151   6/1959   Canada.

WILLIAM D. MARTIN, Primary Examiner

H. J. GWINNELL, Assistant Examiner

U.S. Cl. X.R.

117—143, 145, 155, 161; 162—159